March 9, 1954     H. A. HULSBERG     2,671,336
HYDROGEN ANALYZER
Filed Nov. 30, 1949
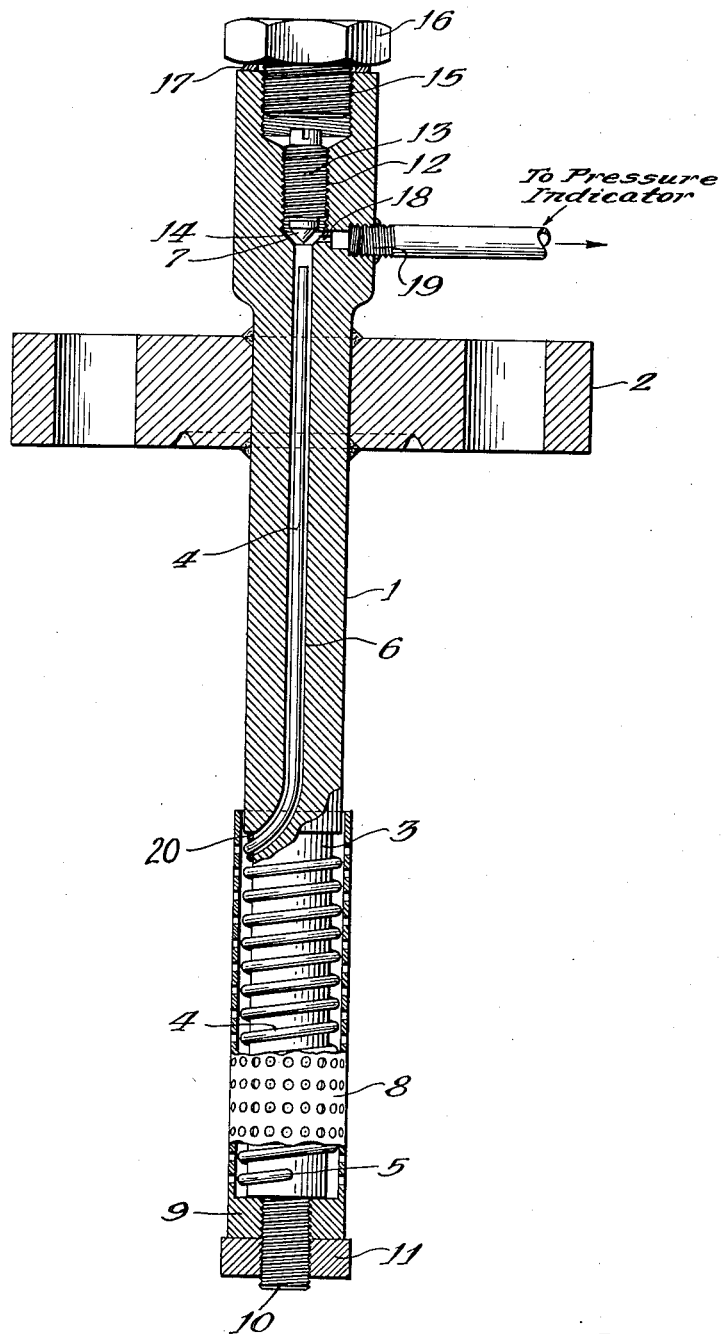
Inventor:
Herbert A. Hulsberg
By: M. P. Venema
      Attorney
Philip J. Liggett
      Agent Patented Mar. 9, 1954

2,671,336

UNITED STATES PATENT OFFICE 2,671,336

HYDROGEN ANALYZER

Herbert A. Hulsberg, Clarendon Hills, Ill., assignor to Universal Oil Products Company, Chicago, Ill., a corporation of Delaware Application November 30, 1949, Serial No. 130,153

7 Claims. (Cl. 73—23)

This invention relates to an improved type of gas detection apparatus, and more particularly to a meter for measuring the concentration of a gas, such as hydrogen, passing through a chamber or conduit in admixture with other gases or vapors.

This type of apparatus operates by using a wall or diaphragm which is permeable to hydrogen, such that the pressure of hydrogen in a separate zone may be measured and compared to the total pressure of the gaseous mixture within a given zone or flow stream. Actual measurement of the hydrogen concentration is made in accordance with the law of partial pressures; i. e., the pressure exercized by each component in a gaseous mixture is proportional to its concentration in the mixture, and the total pressure of the gas is equal to the sum of the partial pressures of its components. Palladium and platinum are materials which are permeable to hydrogen and are thus particularly adaptable for partitioning or separating the partial pressure zone from that of the main gaseous stream. The usual type of instrument for measuring hydrogen by this principle utilizes a diaphragm plate, short tube, or cylindrical section to form the partitioning membrane, and while the operation may be fairly satisfactory, there is usually a considerable lag in the indication of gas concentration due to the time element for the gas to permeate the membrane and build up the partial pressure, or conversely lower the partial pressure in accordance with the concentration in the total gas mixture.

It is, therefore, a principal object of the present invention to provide an improved form of meter which to a considerable extent eliminates the lag in measuring gas concentration by partial pressure within a zone separated by a permeable wall or diaphragm.

It is a further object of the invention to provide an improved gas measuring instrument by utilizing an elongated small diameter tubing, which in turn provides a large surface area permeable to the gas to be measured and a relatively small volume zone for collecting the permeating gas.

It is a further object of the invention to provide a simplified form of construction which is adapted to place the tubing in a protected manner within a conduit or chamber containing the gaseous mixture, and protected passageway means for connecting the tubing to pressure indicating means.

Briefly, the present gas detection apparatus, suitable for measuring the hydrogen concentration in a gaseous mixture, comprises in combination, an extended length of small diameter and small bore hydrogen permeable tubing, with the tubing having a closed end thereto and adapted for positioning within a hydrogen containing chamber, a tube supporting rod and a pressure tight closure member connected to the rod in a manner to removably attach the rod and tubing to the interior of the chamber, and passageway means through the tube supporting rod suitable for passing and connecting the open end of the tubing with an outlet nozzle.

In a preferred embodiment of the instrument, a small size tubing, approaching capillary sizes, of palladium or platinum which is permeable to hydrogen, is coiled helically around the tube supporting member so that it may be held in position within the chamber or conduit having the hydrogen containing gaseous mixture passing therethrough. The small diameter tubing provides a large surface area in comparison to a small internal volume and thus provides a great improvement over the usual type of gas detecting instrument, utilizing a diaphragm having a construction which provides a relatively large surface area in comparison to the volume of the zone for collecting the particular gas to be measured. A preferred embodiment also provides means for passing an open-end of the tubing through the supporting member so that it may terminate exteriorly of the chamber and communicate with a nozzle that in turn connects with pressure indicating means.

It is also an advantage of a preferred construction to have adjustable flow restricting or shut off means at the outlet nozzle of the instrument such that the gas flow may be cut-off at the point where it leaves the tubing and enters the nozzle.

The construction of a preferred embodiment of the instrument, as well as additional features and advantages over the usual type of gas detecting instrument, will be more apparent upon reference to the accompanying drawing and the following description thereof.

Referring now to the drawing, there is indicated a rod-like member 1 having connected thereto a flange 2, which is suitable to removably attach the instrument to a suitable nozzle or port of a chamber or conduit having a gaseous mixture. The interior end of the rod-like member 1 is cut back and provides a smaller diameter section 3 in order that it may accommodate a helically coiled tubular member 4. The interior end of the tubular member 4 is closed, as indicated at 5, while the exterior end of the tube passes through a passageway 6, within the supporting rod member 1, and terminates in a flared open-end 7, the opposite end of passageway 6 being closed by sealing means 20, such as silver solder.

The tubing 5, in accordance with the present invention, is of a hydrogen permeable nature, being of platinum or palladium so that hydrogen may pass through the wall and into the interior thereof, to subsequently exert a partial pressure effect on a suitable pressure indicating means. Preferably the tubing is of a very small size, of the order of 1/16″ O. D. or smaller, or may approach capillary tubing sizes, and thus provide a small internal volume zone for collecting hydrogen which will respond quickly to changes in hydrogen partial pressure. The tube wall is also relatively thin in order to permit rapid transfer of the hydrogen through the wall, however, the wall thickness should be sufficient to withstand the necessary differential pressure conditions.

The helically coiled portion of the tube 4 is covered with a perforated protecting sleeve 8, in order that the tubing is not damaged when being placed in or removed from a chamber, or alternately, to protect the tubing from the pressure of a catalyst bed or the like, where the instrument is inserted into a packed bed of material. The lower end of the protecting sleeve has a threaded portion 9 which accommodates a threaded stem-like portion 10 extending from the lower end of the rod 1. There is also indicated a lock-nut 11 suitable to hold the sleeve portion in place around the tubing and supporting rod. The supporting rod and protecting sleeve may be of a metal suitable to withstand the temperature and chemical conditions, or alternately, of a refractory material, or other substance suitable for the desired processing conditions.

The external portion of the supporting member 1 has a tapped section 12 and accompanying bolt or screw-like member 13 with a tapered end 14 adapted to fit into a seat 7 at the end of the passageway 6. This construction and arrangement permits the screw member 13 to be turned and closed against the seat 7 and shut off the flow through the instrument. Accessibility to the screw member 13 is made through an enlarged section 15 and removable cap screw 16. A gasket 17 is also indicated in the drawing between the cap screw 16 and the end of the supporting member 1 in order to make a pressure tight connection.

In a normal operation, the hydrogen permeating through the wall of the tube 4 within the chamber communicates with or passes from the tubes open end and seat 7 into the outlet nozzle, as provided by the opening 18 and tapped section 19. Suitable tubing and conduit means may connect the outlet nozzle 19 with a pressure indicating instrument, or of course, the pressure indicating means may be connected directly to the hydrogen analyzing instrument at the outlet nozzle itself.

There are various chemical processing operations which involve the use of hydrogen, as well as catalytic petroleum conversion operations, so that an instrument of this type is particularly valuable to the operators to provide an indication of the hydrogen concentration present in a gaseous or vaporous mixture directly within a reaction zone. It is, of course, desirable to operators that the indication shown follow as closely as possible actual operating conditions, without any substantial lag between processing conditions and the concentrations indicated on the instrument. As previously noted, the present arrangement and construction is of a particular advantage over the prior types of instruments in that the small hydrogen permeable tube of extended length, as provided by the helically coiled section 4 on the supporting rod, furnishes a small collecting zone for the hydrogen partial pressure and a relatively large ratio of surface area to internal volume.

The pressure indicating means connecting with the outlet nozzle 19 may be calibrated to provide a ratio in accordance with the total pressure reading of the gaseous mixture and thus provide through a partial pressure reading, the actual concentration of the hydrogen present in the mixture. A pressure gauge connection for measuring or indicating the pressure of the entire gaseous mixture within the chamber is of course not indicated in the drawing, but suitable pressure connecting means may be provided in the chamber or conduit to which the flange 2 connects.

It may also be noted, that both palladium and platinum are more permeable to hydrogen at elevated temperatures, thus, where the hydrogen measuring instrument is to be utilized in a zone of relatively cool gases, it is preferable that a heating coil be combined with the tubular instrument to heat the hydrogen permeable tubing and increase the efficiency of the instrument. The simplified embodiment shown in the present drawing does not indicate a heating instrument and is thus particularly adapted for use in a chamber where the gaseous stream or conversion conditions are at a relatively high temperature causing a heating of the helical coiled palladium or platinum tubing and a high order of operating efficiency.

There are, of course, additional minor variations which may be made in the design and construction of the instrument and which are obvious to those familiar with the design of instruments of this type, or to their use in processing equipment. For example, a different type of mounting flange or connection may be attached to the rod 1 to in turn attach and support the instrument within a processing chamber or conduit. Further, there may be used other means of attaching and holding a protecting sleeve around the small diameter platinum tubing.

I claim as my invention:

1. A meter for measuring hydrogen concentration in a gaseous mixture, which comprises in combination, an extended length of coiled hydrogen permeable tube of small diameter and having a closed end thereto adapted for placement within a hydrogen containing chamber, a tube supporting rod holding said coiled tube thereon, and passageway means through said tube supporting rod adapted to accommodate the open end of said coiled tubing and extend it externally of said chamber, a flange member connecting to said supporting rod and adapted to removably hold the latter and said coiled tubing within said chamber, an outlet nozzle communicating with said passageway means externally of said closure member, with said nozzle adapted to connect with pressure indicating means, and adjustable flow restricting means at the exterior end of said passageway positioned to restrict the flow of hydrogen from said hydrogen permeable tubing to said outlet nozzle.

2. The hydrogen meter of claim 1 further characterized in that a perforated protecting sleeve extends over said supporting rod and said coiled tube member whereby to protect the latter within said chamber.

3. The hydrogen meter of claim 1 further characterized in that said hydrogen permeable tubing is of palladium.

4. The hydrogen meter of claim 1 further characterized in that said hydrogen permeable tubing is of platinum.

5. A hydrogen detecting apparatus comprising in combination, a tube supporting rod having flanged means connecting thereto for supporting the latter in a hydrogen-containing chamber and, the internal end of said supporting rod having a smaller diameter portion, a small diameter hydrogen permeable tubing coiled around said smaller diameter portion of said supporting rod, said tubing having a closed inner end and open external end, passageway means extending through the external and intermediate portions of said tube supporting rod, an external outlet nozzle from said passageway and said rod, whereby the open end portion of said tubing is positioned and extends from the coiled portion thereof to said outlet nozzle through said supporting rod, a perforated protecting sleeve positioned concentrically around said coiled portion of said hydrogen permeable tubing and said supporting rod, with said sleeve removably positioned in place by threaded means at the end of said supporting rod, a tapped opening at the external end of said passageway at said outlet nozzle from said passageway and supporting rod, with an adjustable screw member therein having a tapered end thereon adapted to fit into the open end of said tubing and providing thereby adjustable flow restricting means between said tubing and said outlet nozzle, and removable pressure tight access means at the end of said supporting rod communicating with and enclosing said adjustable screw means.

6. A hydrogen concentration measuring device comprising a supporting rod having a small diameter section and a larger diameter section, a perforated sleeve around and spaced from said small diameter section, a longitudinal passageway through said larger diameter section, an extended length of hydrogen permeable tubing in the space between said sleeve and small diameter section, said tubing being closed at one end and having an open end communicating with said passageway, and a flanged type of closure member carried by said larger diameter section for removably positioning said rod and tubing in a chamber.

7. A hydrogen concentration measuring device comprising a supporting rod having a longitudinal passageway through a portion thereof, a small diameter hydrogen permeable tube having at least a portion thereof coiled around another portion of said rod and having an open end in communication with said passageway, the opposite end of said tube being closed, an outlet nozzle for said passageway at an end portion of the supporting rod, and a flanged pressure tight closure member mounted on said rod between said nozzle and the coiled portion of said tube.

HERBERT A. HULSBERG.

References Cited in the file of this patent

UNITED STATES PATENTS

| Number | Name | Date |
|---|---|---|
| 2,400,940 | McCollum | May 28, 1946 |
| 2,456,153 | Watson | Dec. 14, 1948 |
| 2,536,610 | King et al. | Jan. 2, 1951 |

OTHER REFERENCES

Article: "Use of a Palladium Tube in Gas analysis;" by Fleiger—in "Industrial and Engineering Chemistry," Sept. 15, 1938—vol. 10, No. 9.